United States Patent [19]
Jorgensen

[11] Patent Number: 6,067,878
[45] Date of Patent: May 30, 2000

[54] SYSTEM AND METHOD FOR RESTRICTING GEAR SHIFT OPERATION IN TIMBER HARVESTING TRACTORS

[75] Inventor: Chad K. Jorgensen, Byron, Minn.

[73] Assignee: Blount, Inc., Montgomery, Ala.

[21] Appl. No.: 09/226,003

[22] Filed: Jan. 6, 1999

[51] Int. Cl.[7] ..................................................... F16H 47/02
[52] U.S. Cl. ........................... 74/731.1; 74/732.1; 475/74; 475/78; 477/36; 477/125
[58] Field of Search ................................ 74/731.1, 732.1, 74/336 R, 337, 473.19, 473.21; 475/74, 78, 199, 208, 209; 477/126, 125

[56] References Cited

U.S. PATENT DOCUMENTS

| | | | |
|---|---|---|---|
| 4,488,457 | 12/1984 | Nishimura et al. | 477/126 |
| 4,680,983 | 7/1987 | Brown | 477/126 |
| 5,678,462 | 10/1997 | Bausenhart et al. | 74/731.1 |

*Primary Examiner*—Sherry L. Estremsky
*Attorney, Agent, or Firm*—Richard G. Lione; Brinks Hofer Gilson & Lione

[57] ABSTRACT

A system for automatically preventing gear shift operation in a timber harvesting tractor when the tractor is moving. The system includes a drive train powered by a transmission. The drive train includes a transfer case which is shifted by the operator of the tractor through manipulation of an electrical control circuit. The electrical control circuit is rendered ineffective to shift the transfer case when the drive train is being driven by the transmission and the tractor is moving.

13 Claims, 2 Drawing Sheets

SYSTEM AND METHOD FOR RESTRICTING GEAR SHIFT OPERATION IN TIMBER HARVESTING TRACTORS

FIELD OF THE INVENTION

This invention relates generally to gear shift operation in a drive train for a tractor or the like. It relates particularly to a system and method for restricting gear shift operation in timber harvesting tractors.

BACKGROUND OF THE INVENTION

A typical timber harvesting machine is a feller buncher which includes a four-wheel drive tractor and an attachment. The attachment may be bunching shear. It may also be a saw, a brush cutter, a stump grinder or other forestry or industrial attachment. An example may be seen in the Model 511EX feller buncher manufactured and sold by the forestry and industrial equipment division of Blount, Inc. in Owatonna, Minn., assignee of the present application.

The Model 511EX tractor normally is powered by a 185 horsepower diesel engine. The engine supplies motive power to each of the four wheels through a hydrostatic transmission or hydrostat. The hydrostat includes a variable displacement hydraulic pump which drives a variable displacement hydraulic motor. The hydraulic motor in this tractor is a bent axis motor manufactured and sold by the Sauer-Sundstrand Company of Ames, Iowa, but other similar motors may be used.

The bent axis motor has two settings, a minimum angle setting providing lower displacement and a maximum angle setting providing higher displacement. The output or drive shaft from the motor rotates at a speed determined by the angle setting of the motor and the volume of hydraulic fluid supplied by the pump. The direction of rotation of the motor and the forward or reverse travel of the tractor is dictated by the direction of pump output. The operator controls this from the cab through foot pedals and a hydraulic control circuit.

The bent axis motor drives the tractor's front and rear axle drive shafts through a two-speed, helical gear transfer case. Shifting gears in the transfer case between a low gear and a high gear is effected by the operator through an electrical control circuit and a solenoid operated valve which directs hydraulic fluid to and from an actuator cylinder. The cylinder dictates the position of a gear shift fork. A three-way switch in the cab permits the operator to move the three-way, two-position valve between a low gear position, a high gear position and a neutral position.

Standard operating procedure for such feller buncher machines involves stopping the tractor before shifting gears. This procedure is recommended by the manufacturer because, it has been found, shifting the machine while it is being driven frequently results in damage to the transfer case, including the gears and/or the shifting forks, and it consistently results in excess wear of these components. In addition, when the machine is shifted while it is moving, the synchronizing shaft in the hydrostat's bent axis motor is suddenly subjected to additional stress due to torque changes and this, it has been found, may result in damage to the shaft.

BRIEF SUMMARY OF THE INVENTION

It is an object of the present invention to provide a system for restricting gear shift operation in a vehicle.

It is another object of the present invention to provide a system for restricting gear shift operation in a timber harvesting tractor.

It is still another object to provide a system for automatically preventing gear shift operation in a timber harvesting tractor when the tractor is moving.

It is yet another object to provide a method for preventing gear shift operation in a vehicle.

The foregoing and other objects are realized in a system wherein the transfer case is shifted by a hydraulic cylinder actuator. A solenoid actuated, three-position, two-way valve controls the flow of hydraulic fluid to the linear actuator cylinder. In its center position the valve supplies no pressurized fluid to the cylinder, leaving it in neutral and relieving the transfer case fork of any force. In its low position it supplies pressurized fluid to one end of the cylinder to drive the transfer case forks into low gear orientation. In its high position it supplies pressurized fluid to the other end of the cylinder to drive the transfer fork into high gear orientation. The fork moves a shifting collar in the transfer case to change gears.

The system operator has a three-position gear shift switch in the cab with a zero position, a one position and a two position. The switch is an element in a control circuit and opens the circuit when the switch is in its one position. When the operator moves the switch to its two position, the circuit is conditioned to move the solenoid actuated valve into its low position. When the operator moves the switch to its zero position, the circuit is conditioned to move the solenoid actuated valve into its high position. The switch is "momentary" in that it returns to its one position automatically when released.

The tractor is driven by the output shaft of the bent axis motor in the hydrostat. The output shaft from the motor drives the tractor forward or backward in the gear which has been selected using the gear shift switch. The speed at which the tractor is driven (within that gear range) is determined by the angle of the bent axis motor and the volumetric output of the system's hydraulic pump.

The volume and direction of flow of hydraulic fluid to the motor is controlled by the operator through a hydraulic control circuit with foot pedals in the cab. By manipulating the foot pedals, the tractor is driven forward in low gear, for example. According to the invention, if the operator wishes to shift into high gear, the tractor must be stopped before the gear shift actuator cylinder will be actuated.

If the operator presses the three way switch into its zero position, for example, while the tractor is moving, control pressure to the hydrostat is cut off and the tractor comes to a stop. Only when it has stopped (or nearly stopped), and servo-pressure in the hydrostat drops below 50–60 psi, does the electrical control circuit transmit a signal to the transfer case actuator cylinder. The transfer case is then shifted into high gear.

BRIEF DESCRIPTION OF THE DRAWINGS

The invention, including its construction and method of operation, is illustrated diagrammatically in the drawings, in which.

DESCRIPTION OF THE PREFERRED EMBODIMENT

Figure 1:
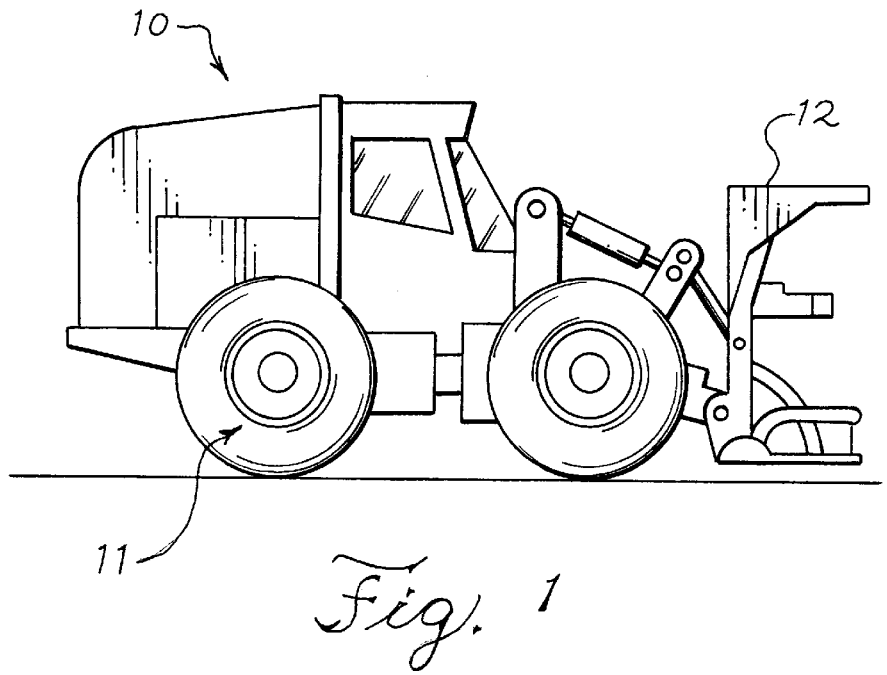
FIG. 1 is a perspective view of a typical feller buncher machine, including tractor and attachment.

Referring now to the drawings, and particularly to FIG. 1, a timber feller buncher machine incorporating a drive train control system embodying features of the present invention is seen generally at 10. The feller buncher machine 10 is, in the present illustration, a HYDRO-AX 511EX rubber-tired feller buncher tractor 11 manufactured by the Forestry and Industrial Equipment Division of Blount, Inc., with a twenty inch bunching shear attachment 12, also manufactured by Blount, Inc.

Figure 2:
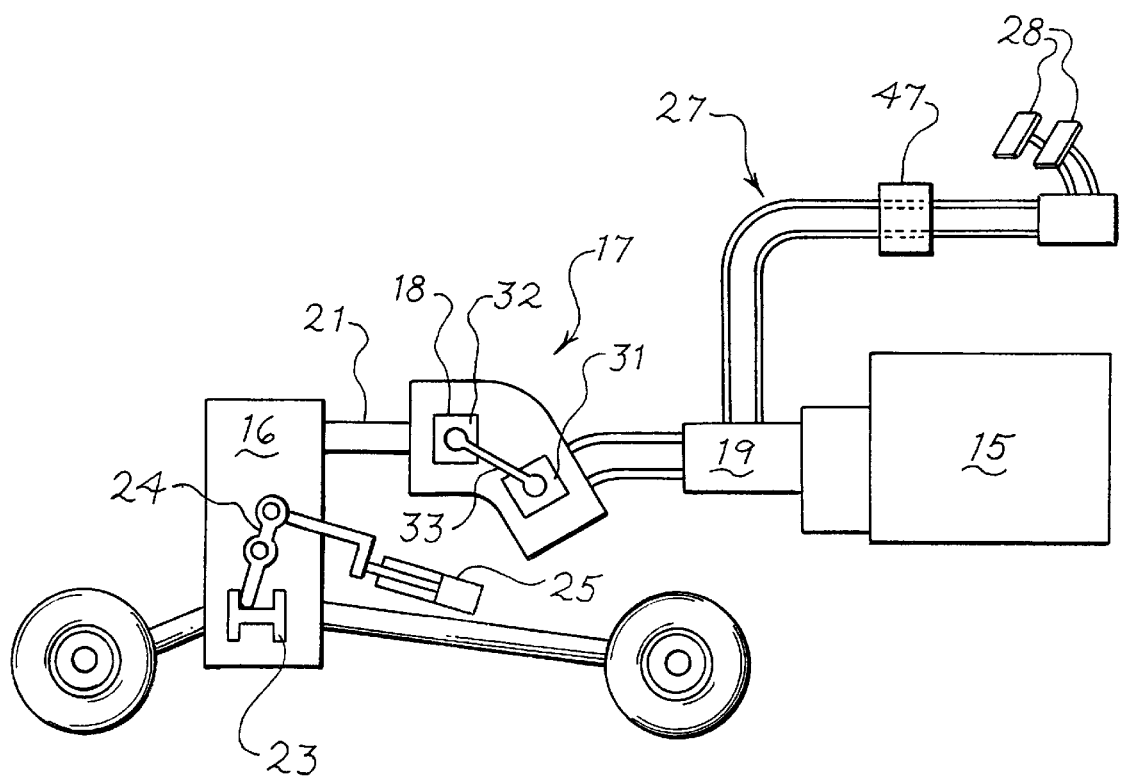
FIG. 2 is a diagrammatic illustration of the drive train for the feller buncher tractor, including its hydrostat, and the control system for the drive train which embodies features of the invention.

Referring now also to FIG. 2, a diagrammatic illustration of the driving components for the machine 10 is illustrated. The tractor 11 is driven by a diesel engine 15 through a drive train which includes a two-speed, helical gear transfer case 16 and a hydrostat 17. The hydrostat 17 includes a bent axis, variable displacement motor 18 which is driven by a variable displacement pump 19.

The engine 15 is a six-cylinder Cummins Diesel rated at 185 hp at a governed, full load RPM of 2200. It drives the hydrostat pump 19 which, in turn, supplies hydraulic fluid under pressure to drive the bent axis motor 18.

The output shaft 21 of the hydrostat is connected to the transfer case 16 which, in the present illustration, is a conventional two-speed, helical gear unit. The transfer case 16 contains a two-position, gear shifting collar 23 which is movable between its high and low gear positions by a shifting fork 24. The shifting fork 24 is, in turn, movable by a hydraulic actuator cylinder 25.

The transfer case 16 is designed to maintain the tractor 11 in either low or high gear. The low gear speed range in the machine illustrated is 0–4.5 mph. The high gear speed range is 0–13.5 mph.

The speed at which the tractor 11 moves within each gear range is determined by the angle of the bent axis motor 18 and the rate at which hydraulic fluid is supplied by the pump 19 in the hydrostat 17. The operator in his cab controls the pump 19 through a hydraulic control circuit 27.

The hydraulic control circuit 27 includes two control pedals 28 through which the operator controls the output, both as to volume and direction, of the pump 19. The angle of the cylinder block 31 relative to the crank shaft drum 32 in the motor adjusts automatically. Rotation of the block 31 and drum 32 is synchronized by a synchronizing shaft 33 between them.

Figure 3:
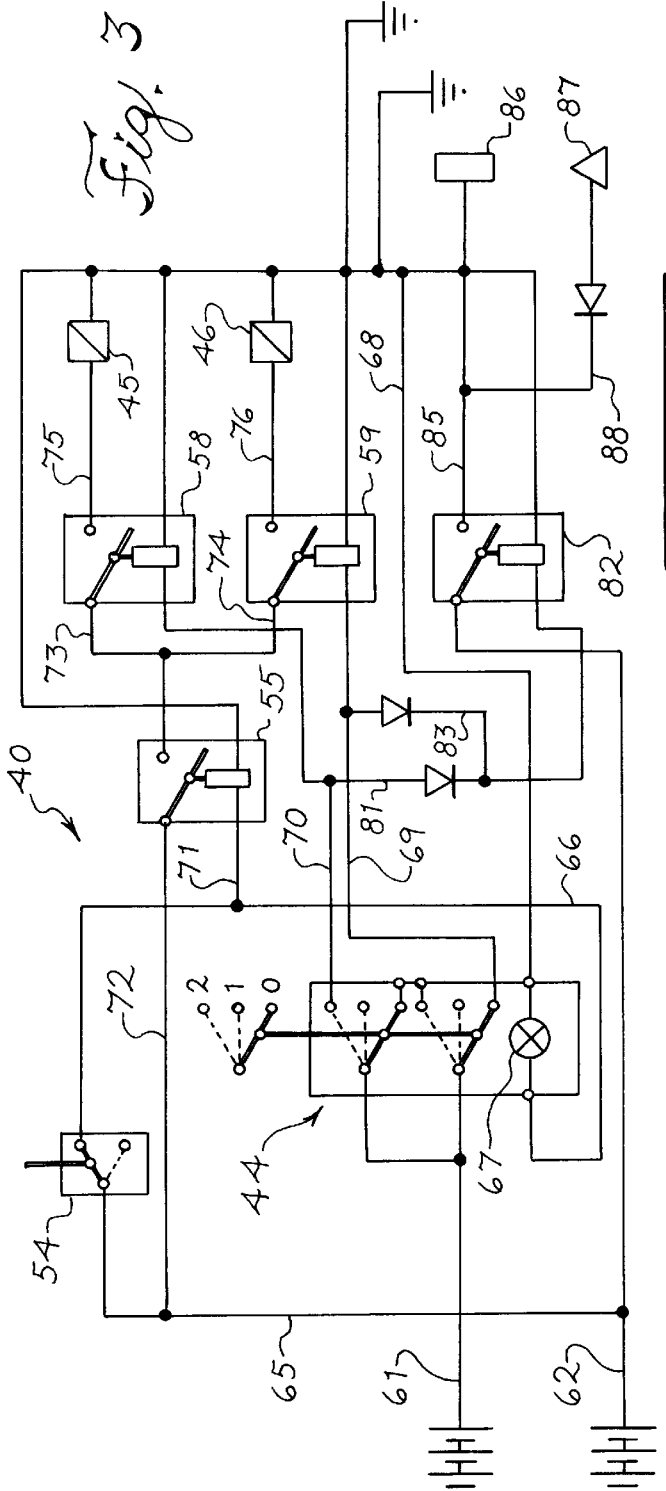
FIG. 3 is a diagrammatic illustration of the electrical control circuit and components for the system of FIG. 2.

Gear shifting is effected by the operator through an electrical control circuit 40 which controls the operation of the hydraulic actuator cylinder 25. FIG. 3 is a schematic illustration of this electrical control circuit 40. According to the invention, the electrical control circuit 40 permits gear shifting to take place only when the tractor 11 is stationary or moving so slowly that servo-pressure in the pump 19 is below 50–60 psi, so that neither the motor nor the transfer case is damaged.

Referring to FIG. 3, the control circuit 40 includes a three-position, gear selector switch 44. The switch 44 is on the operators control panel and permits the operator to select high gear or low gear by moving the switch from a one position to a zero position, or from a one position to a two position, respectively. The switch 44 is a momentary switch which always returns to its one position when released. In the one position, no current can flow to actuator solenoids 45 and 46 which control the operation of the hydraulic actuator cylinder 25, and no fluid pressure is exerted in the cylinder. This assures that no force acts on the shifting fork 24. As a result, wear on the fork 24 is reduced. Meanwhile, the tractor 11 is held in either previously selected gear by the detents in the transfer case.

Assume now that the tractor 11 is in low gear and moving at 3–4 miles per hour, for example. If the operator attempts to switch to high gear by moving the switch 44 to the zero position (without stopping the tractor) the circuit 40 closes a pilot valve 47 and vents control pressure in the circuit 27 controlled by the foot pedals 28. The pump 19 operation is interrupted and the tractor stops.

Figure 4:
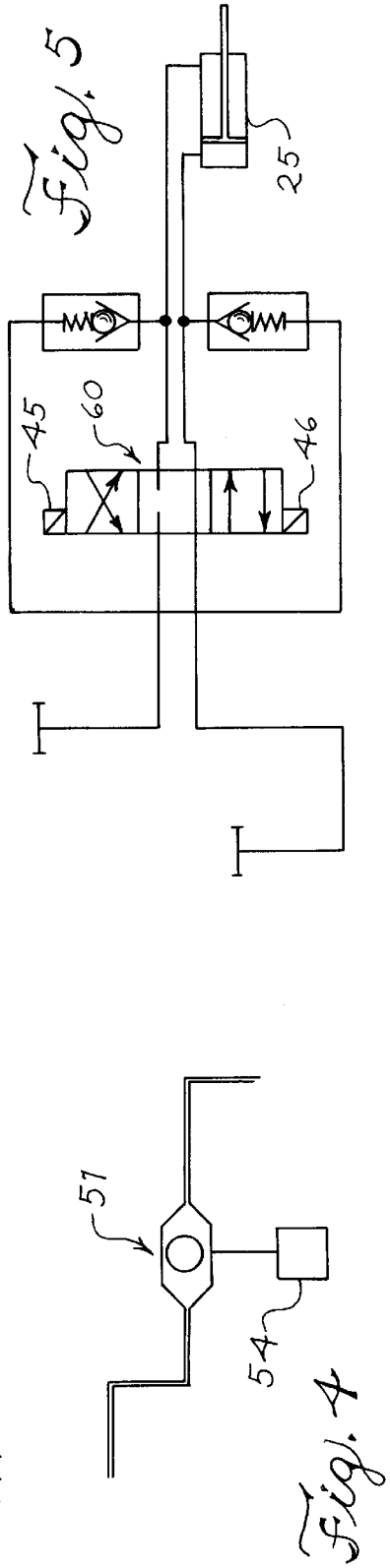
FIG. 4 is an enlarged diagrammatic illustration of the hydraulic and electrical circuit interface in the system of FIG. 2.

Referring now also to FIG. 4, as the tractor 11 slows to a stop, a pressure switch 54 connected to the pump 19 in the hydrostat 17 senses when servo-pressure therein falls below 50–60 psi (the tractor 11 has stopped or nearly stopped) and closes the circuit 40. A shuttle valve 51 between the pump 19 and the switch 54 assures that the switch operates in both directions of tractor 11 travel. Closing the switch 54 permits current to flow to the relay 55, closing this relay. Relay 59 is closed because the switch 44 is in its zero position, supplying current to that relay. Relay 58 is open because the switch 44 is not in its two position. A circuit is completed to the high gear actuator solenoid 46.

Figure 5:
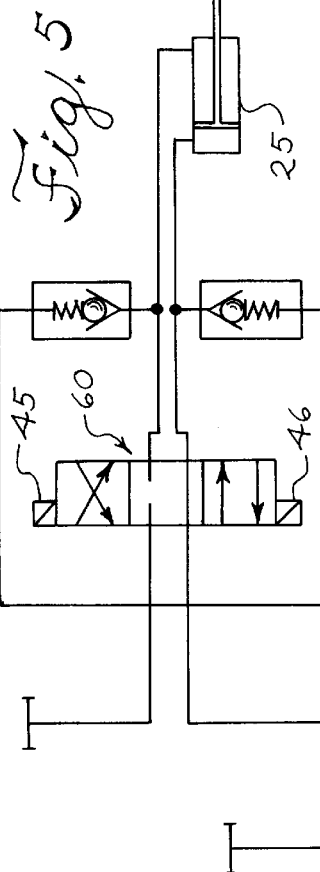
FIG. 5 is an enlarged diagrammatic illustration of the gear shift solenoid and control valve assembly for operating the gear shift actuator cylinder.

The high gear solenoid 46 is energized by current flowing to it. As seen in FIG. 5, the high gear solenoid 46 is shown mounted on one end of a three-position, two-way valve 60. The low gear actuator solenoid 46 is shown mounted on the other end. Actually, they are both mounted on the same end of the valve but are shown this way for ease of illustration. The valve 60 controls the flow of hydraulic fluid to the actuator cylinder 25 from a suitable source (not shown).

With the switch 44 held in its zero position, the high gear solenoid 46 moves the valve 60 and reverses fluid flow to the cylinder 25. The cylinder 25 moves the fork 24 in the transfer case 16. The transfer case 16 shifts gears from low gear to high gear. When the switch 44 is released, the pilot valve 47 opens. Control pressure to the hydrostat control circuit 27 is restored. The operator can then drive the tractor 11 in high gear.

Referring again to FIG. 3, the actuator circuit 40 will now be described in greater detail. The circuit 40 includes first and second leads 61 and 62 from the tractor 11 battery (not shown). The leads 61 and 62 are connected by lead 65 to the input side of the aforementioned pressure switch 54. The output side of the switch 54 is connected by lead 66 to the light indicator 67. The indicator 67 is connected by lead 68 to ground.

Lead 61 is also connected to the input side of the three-position gear selector switch 44. That switch 44 has three output positions, as has been pointed out, a zero position, a one position and a two position. The one output position is dead. The zero output position has lead 69 connected thereto. The two output position has lead 70 connected thereto.

The lead 69 supplies current to close relay 59 solenoid when the switch 44 is in its zero position. The lead 70 supplies current to close the relay 58 solenoid when the switch 44 is in its two position.

Another lead 71 connects the output side of the two position pressure switch 54 to the relay 55 solenoid. When the pressure switch 54 is closed, the lead 71 supplies current to the solenoid and closes the relay 55.

Another lead 72 connects the battery leads 61 and 62 (through the lead 65) to the input side of the relay 55. When the relay 55 is closed, current flows through the relay 55 to the leads 73 and 74 which are connected to the input sides of the relays 58 and 59, respectively. The output side of the relay 58 is connected by lead 75 to the low gear solenoid 45. The output side of the relay 59 is connected by lead 76 to the high gear solenoid 46.

The lead 69 previously referred to also supplies current through lead 83 to a relay 82 solenoid when the lead 69 is hot. The same is true of lead 70 through lead 81. The input side of this relay 82 is connected to battery lead 62.

The output side of relay 82 is connected by lead 85 to a brake solenoid 86. The brake solenoid 86 is also connected to the brake switch 87 through lead 88. The brake solenoid 86 is effective to close the pilot valve 47 when the brake switch is actuated or switch 44 is moved to positions zero or two.

The function of the circuit 40 in the context of restricting gear shift operation has previously been discussed. The operator cannot shift gears while the tractor 11 is moving because the circuit 40 is rendered inoperative to energize the solenoids 45 and 46 which control the position of the three-way, two position valve 60. The switch 44 is a momentary switch, however, so once it is switched to a selected gear position, shifting will automatically take place when the tractor 11 stops. When the light indicator 67 is on, the operator knows conditions are favorable for shifting.

It should be pointed out here, however, that when the tractor 11 has stopped, the gears in the transfer case 16 may not be properly aligned to accommodate shifting by the collar 23, In such case, the operator can readily move the gears into alignment for mesh by turning the front wheels of the tractor 11 back and forth using power steering.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. In a drive train for a vehicle including a power transmission and a transfer case, a system for preventing the shifting of gears in the transfer case while there is a torque output from the transmission, comprising:
    a) an actuator for mechanically shifting the gears in the transfer case;
    b) a control circuit for energizing said actuator to shift into a desired gear when the circuit is closed and a control medium is supplied to the circuit;
    c) a switch in said circuit for opening said circuit when motive power is supplied to said transmission and closing said circuit when motive power is not supplied to said transmission; and
    d) a gear selector switch for controlling the supply of said control medium to said circuit.

2. The system of claim 1 further characterized in that:
    a) said circuit is an electrical circuit and said control medium is an electrical current.

3. In a drive train for a vehicle including a hydrostat and a transfer case, a system for preventing the shifting of gears in the transfer case while there is a torque output from the hydrostat whereby there is servo-pressure in the hydrostat, comprising:
    a) an actuator for mechanically shifting the gears in the transfer case;
    b) a control circuit for energizing said actuator to shift into a desired gear when the circuit is closed and a control medium is supplied to the circuit;
    c) a pressure sensitive switch in said circuit for opening said circuit when the hydraulic servo-pressure in said hydrostat is above a predetermined level and closing said circuit when said hydraulic servo-pressure is at or below said predetermined level; and
    d) a gear selector switch for controlling the supply of said control medium to said circuit.

4. The system of claim 3 further characterized in that:
    a) said circuit is an electrical circuit and said control medium is an electrical current.

5. The system of claim 4 further characterized in that:
    a) said actuator comprises a fluid operated cylinder;
    b) said system further includes a control valve for controlling the operation of said cylinder; and
    c) said circuit includes a solenoid for operating said control valve.

6. The system of claim 5 further characterized in that:
    a) said circuit includes two solenoids for operating said control valve;
    b) one of said solenoids being effective to move said control valve to a low gear actuating position and the other of said solenoids being effective to move said control valve to a high gear actuating position where current is supplied to the respective solenoid.

7. A system for preventing the shifting of gears in a transfer case, comprising:
    a) an actuator for shifting the gears in the transfer case;
    b) a solenoid arrangement for causing said actuator to shift gears when current is supplied to said solenoid;
    c) an electrical circuit for supplying current to said solenoid;
    d) a control switch in said circuit for closing said circuit to condition it for supplying current to said solenoid; and
    e) a switch in said circuit which is sensitive to driving force at an input to said transfer case to open said circuit when said driving force is present.

8. The system of claim 7 further characterized in that;
    a) said solenoid arrangement includes a high gear solenoid and a low gear solenoid;
    b) said control switch being a three-position switch which controls current flow to said high gear solenoid in one setting, to said low gear solenoid in another setting, and opens said circuit in a third setting.

9. The system of claim 8 further characterized in that:
    a) said circuit also includes a high gear solenoid switch and a low gear solenoid switch;
    b) said high and low gear solenoid switches normally being open and being selectively closed by movement of said control switch to a respective setting.

10. An electrical system for controlling a gear shift operator in a vehicle drive train, comprising:
    a) a first solenoid for moving said gear shift operator into a first gear position;
    b) a second solenoid for moving said gear shift operator into a second gear position,
    c) a first circuit connecting a source of current to said first solenoid;
    d) a second circuit connecting a source of current to said second solenoid;

e) a first relay for opening and closing said first circuit;

f) a second relay for opening and closing said second circuit;

g) means including a manually operated switch for causing said first relay to close said first circuit;

h) means including a manually operated switch for causing said second relay to close said second circuit; and i) a third relay for opening and closing both said first and second circuits;

j) said third relay being opened and closed by means including a switch responsive to operation of said drive train.

11. The electrical system of claim 10 further characterized in that:

a) said manually operated switch comprising a three position switch which closes a circuit to said first relay in one position and said second relay in a second position;

b) the third position of said switch being effective to open circuit to both said first and second relays.

12. A timber harvesting tractor, comprising:

a) a four-wheel drive system including a hydrostatic transmission b) a gear box for shifting gears in a drive train connecting the transmission to each of the four wheels; and c) a system for preventing the shifting of gears while the tractor is moving at a speed greater than a predetermined speed.

13. A method of preventing the shifting of gears in a transfer case while a drive shaft is supplying torque to said transfer case, comprising:

a) sensing the presence of driving force supplied to the drive shaft to determine when the driving force has fallen below a predetermined level;

b) providing a circuit for actuating a gear shift mechanism which is effective to shift gears in the transfer case when actuated in a predetermined manner;

c) rendering said circuit ineffective to actuate said gear shift mechanism when the driving force is above said predetermined level; and d) rendering said circuit effective to actuate said gear shift mechanism when the driving force is below said predetermined level.

\* \* \* \* \*